United States Patent

[11] 3,612,757

[72] Inventor George Edward Anderson
Indianapolis, Ind.

[21] Appl. No. 851,545
[22] Filed Aug. 20, 1969
[45] Patented Oct. 12, 1971
[73] Assignee RCA Corporation

[54] COLOR TELEVISION KINESCOPE SETUP APPARATUS
9 Claims, 1 Drawing Fig.

[52] U.S. Cl. ........................................................ 178/5.4 TE, 178/DIG. 4, 330/51
[51] Int. Cl. ........................................................ H04n 5/44
[50] Field of Search ........................................... 178/5.4 TE, 5.4 R, DIG. 4; 328/258; 330/51; 225/462

[56] References Cited

UNITED STATES PATENTS

| | | | |
|---|---|---|---|
| 2,559,902 | 7/1951 | Scott | 330/51 |
| 2,651,684 | 9/1953 | Hargreaves et al. | 330/51 |
| 3,114,796 | 12/1963 | Stark, Jr. et al. | 178/5.4 |
| 3,264,566 | 8/1966 | Kaufman et al. | 325/462 |
| 3,270,125 | 8/1966 | Kelly et al. | 178/5.4 |
| 3,365,675 | 1/1968 | Gaddy et al. | 330/51 |
| 3,461,225 | 8/1969 | Crookshanks et al. | 178/5.4 |

*Primary Examiner*—Robert L. Richardson
*Assistant Examiner*—P. M. Pecori
*Attorney*—Eugene M. Whitacre

ABSTRACT: A setup control apparatus for a color kinescope uses a switch for removing operating potential from an active device, as a vacuum tube, included in a video information signal channel, while further switching in an impedance for biasing the beam control electrodes of the kinescope at a predetermined level compatible with performing setup adjustments on the kinescope.

PATENTED OCT 12 1971 3,612,757
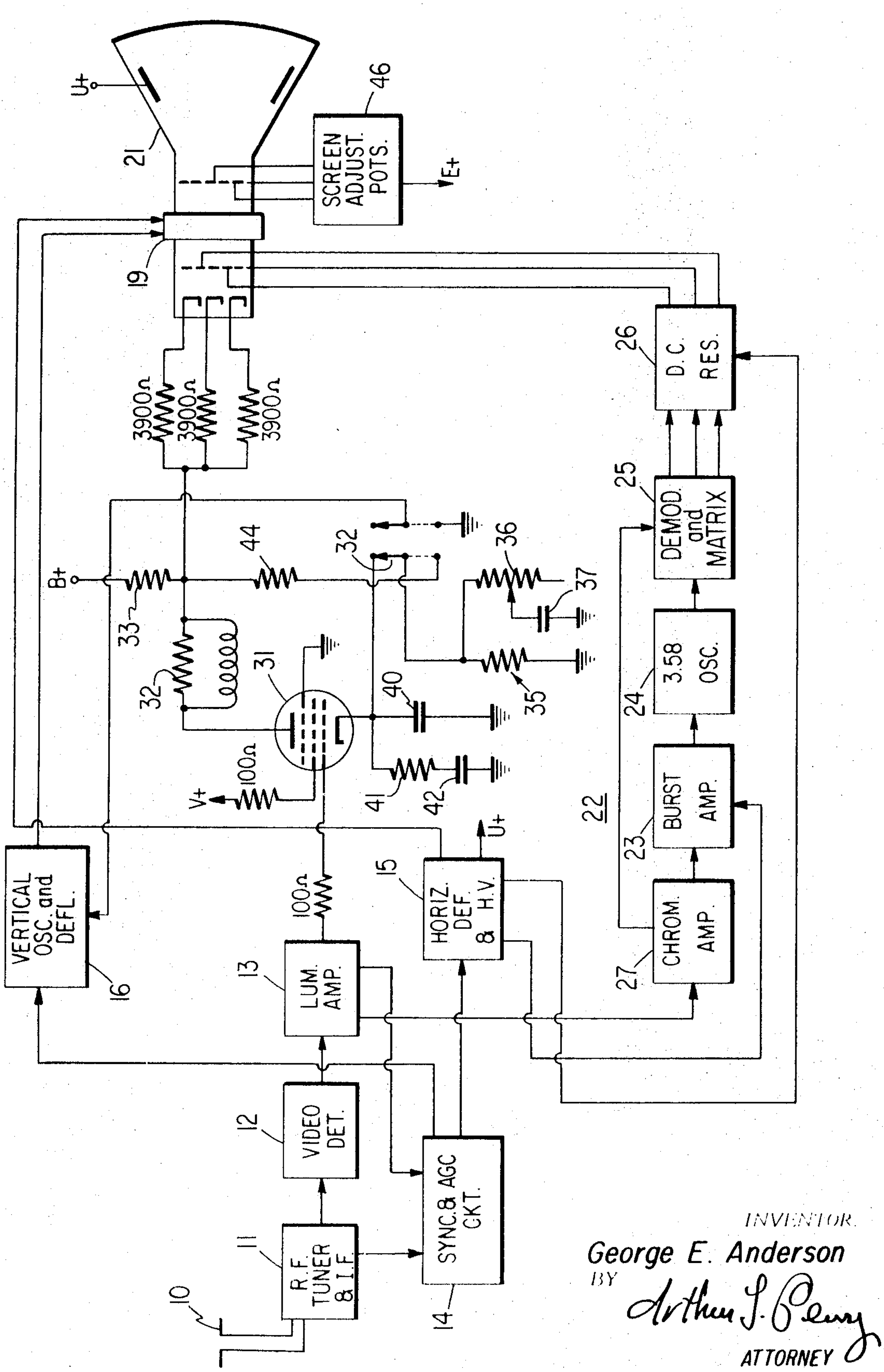
INVENTOR.
George E. Anderson
BY Arthur J. Perry
ATTORNEY

COLOR TELEVISION KINESCOPE SETUP APPARATUS

This invention relates to color television receivers and more particularly to apparatus for controlling the operation of a color kinescope therein.

In order to provide optimum operation for a color kinescope in a receiver, certain controls associated therewith are adjusted in accordance with a procedure commonly referred to as a kinescope setup procedure. Basically the setup procedure is to correct for a number of variations inherently resulting from the multigun, multiphosphor character of the reproducer. Such variations are partly dependent upon the cutoff characteristics of the electron guns and concerning the efficiency of the respective phosphors. A goal of the setup procedure may be viewed as obtaining the maximum bright display while further maintaining proper "tracking" at all brightness levels.

Many modern day receivers include service or setup switches to enable the technician to perform the setup procedure without requiring complicated test equipment. In this manner he is enabled to adjust the kinescope properly at any location of the television receiver promptly and efficiently. Such switching arrangements used in connection with the kinescope setup procedure serve to provide the capability for selectively switching the receiver from its normal operating condition to a setup condition in which:

1. The normal luminance or video channel drive to the kinescope cathodes is disabled.

2. A predetermined reference black level voltage is applied to each of the kinescope cathodes.

3. The receiver's vertical deflection circuitry is disabled to permit critical adjustment of the cutoff potential of each gun.

A use of such switching setup adjustment apparatus may be achieved at any time desired without concern of the nature of the program material available at that time and without reliance upon displayed programs which would render any such setup procedure more difficult to perform.

Such prior art switching circuits include multipole, multithrow switch configurations. For example, prior art switching arrangements have a pair of poles coupled with a suitable common contact which serves to ground an input electrode of an active device in the vertical oscillator section during the service mode. This contact disables the vertical oscillator. Simultaneously therewith, another switch section serves to open the output drive point between the video output amplifier stage and the cathode of the kinescopes. In a typical configuration the video output drive is disabled by opening the path between the output electrode of the active device, which may be a plate or collector electrode of a tube or transistor respectively, and the lead coupling to the cathode electrodes of the kinescope.

Still other prior art configurations disable the video channel via the automatic gain control circuit or AGC circuit. In such embodiments the video channel of the TV receiver is disabled by substantially reducing the gain of the RF and IF amplifiers. Such systems disable the vertical oscillator as indicated above. Basically the above-described prior art setup arrangements possess certain disadvantages. For example, the embodiment which performs setup procedure connections by switching between the output of the wide band video stage and the kinescope cathode require wiring of the switch contacts to the plate electrode of the output video stage. This introduces relatively large shunt capacity which results in a decrease of the bandwidth. Therefore, additional components or critical switch placement are required with respect to the video amplifier to achieve the bandwidth necessary for proper video operation.

In the embodiments which operate on the AGC circuit to disable video information the voltage necessary to suitably reduce the IF and RF amplifier gains may be quite large, and such voltages often times may be of such magnitudes which would undesirably tend to break down the associated device.

Furthermore, when operating on the AGC circuit it may be very difficult to actually disable the display, and spurious video information may still couple to the kinescope and therefore, disturb the setup procedure. In operating on the AGC circuit oftentimes the disabling of the RF and IF amplifiers without removal of the video amplifier action would tend to place an improper DC bias on the kinescope cathodes. This would tend to drive the kinescope at a relatively high beam current; thereby providing a high-brightness display and means would have to be introduced to compensate for this adverse effect. Such compensating circuits using the AGC circuit for video disabling would, therefore, result in additional components and hence involve more expense.

Accordingly, it is an object of the present invention to provide an improved apparatus for enabling color kinescope setup operation.

It is a further object of the present invention to provide a receiver apparatus enabling switching of the kinescope from the normal operating mode to a setup mode.

These and other objects of the present invention are accomplished by employing a switch means which operates in a setup position to open a DC path of the output video amplifier, thus rendering the same inoperative. Simultaneous with the opening of the DC path a suitable impedance is coupled between the cathodes of the kinescope and a point of reference potential and provides a suitable reference bias for the kinescope cathodes during the setup procedure.

A further switch section serves to disable the vertical oscillator, during the setup mode, by placing reference potential on a suitable input electrode of an active device associated therewith. The resultant operation serves to vertically collapse the kinescope raster and to therefore effectively compress the 525 lines of the raster into virtually a single line at a representative brightness level. This enables the service man or operator to adjust the screen potentiometers and reliably affect the cutoff potential of three different electron guns associated with the color kinescope.

Other objects and advantages will be readily appreciated by those skilled in the art after a reading of the following detailed description, and inspection of the accompanying drawing in which the sole FIGURE illustrates in block and schematic form a color television receiver incorporating apparatus in accordance with an embodiment of the present invention for providing a novel color kinescope setup procedure.

A color television receiver is illustrated with the usual front end structure including an antenna 10, an RF amplifier-converter, and an IF amplifier 11, and a video detector 12. The detected composite color television signal output of the video detector 12 is applied to a luminance amplifier 13 having a plurality of separate outputs. One of the luminance amplifier outputs is applied to a sync, and AGC circuit 14, for recovery of the deflection synchronizing components of the composite signal which components are applied to the usual horizontal and vertical deflection circuits 15 and 16 respectively. The deflection circuits serve to develop suitable deflection waveforms for energizing the respective windings on the deflection yoke 19. The deflection yoke 19 is provided to effect suitable deflection of the electron beams of a color kinescope 21 which serves as the color image reproducer. The illustrated color kinescope 21 is of the well-known three-gun shadow-mask type.

Another output of video amplifier 13 is supplied to a chrominance amplifier channel 22 which conventionally includes suitable apparatus for selecting the color subcarrier components of the composite signal, amplifying the selected signal and synchronously demodulating the color subcarrier components. Associated with the subcarrier detecting apparatus of a typical chrominance channel 22 is a local source of reference oscillations 24 of the color subcarrier frequency suitably synchronized in accordance with the color synchronizing component of the composite signal for achieving the desired signal detection. A subcarrier detecting apparatus or demodulators 25 may include suitable matrixing apparatus for combining the synchronized outputs to achieve production of the color difference signal outputs. These signal outputs are supplied to the respective grid electrodes of the electron gun structure of color kinescope 21. A further output of the luminance amplifier 13 is applied to the grid electrode of a luminance or video output amplifier 31 via a preamplifier circuit which may include a luminance delay line serving to equalize the delay of the luminance signal component of the composite signal with the delay inherently suffered by the chrominance components in the chrominance channel. The amplified luminance signal output appears at the anode of amplifier 31 and is applied to the cathode electrode of the electron gun structure of the color kinescope 21.

Following is a brief consideration of the operating characteristics of kinescope 21, the problem to be encountered and the operating parameter adjustments desired. The electron gun structure of the color kinescope 21 comprises three separate electron guns arranged to produce respective beams destined to approach the phosphor surface at respectively different angles, such as to selectively cause light emission from respective ones of the three different color phosphors. Each gun included in the color kinescope 21 has a cathode, a control grid, and a screen grid, serving as a first anode or a first accelerating electrode. The three separate guns and associated electrodes are further controlled by means of a common ultor electrode energized at a high-voltage level U+ to supply the final acceleration of the respective electron beams. The high-voltage potential applied to the ultor electrode, designated as U+, is developed in the horizontal deflection and high-voltage module 15. In affecting proper operation of the color kinescope 21 certain practical problems arise which are complicated by the multiple gun, multiple phosphor nature of the reproducer. For example, the characteristics of the three guns inevitably differ to some extent, likewise the efficiency of the three types of phosphors employed at the display screen also differ. Furthermore, such differences may further vary from tube to tube. To provide adjustments to correct for the cutoff characteristic variations between the respective electron guns, individual controls are provided for setting the DC operating voltage supplied to the screen grids of each of the three electron guns. Such controls are usually potentiometers. Each individual potentiometer is typically associated with a respective screen electrode. A common terminal of the potentiometers is connected to a source of energizing potential designated as E+ and also developed within the horizontal deflection and high-voltage circuits 15. Adjustment of the screen potential by means of the potentiometers varies the respective DC potential on one of the screen grids with respect to any other.

The voltage and signal applied to the cathode electrodes of the kinescope is developed by the output video tube 31. The plate electrode of the video tube 31 is coupled to B+ via the series connection of resistors 32 and 33. In shunt with the resistor 32 is inductor 34 which serves to peak the high-frequency response of the video amplifier 31 necessary for obtaining the desired bandwidth. The exact DC potential at the plate electrode of the amplifier 31 and, therefore, the potential placed on the cathode electrodes of the kinescope 21 is determined by a brightness control located subsequent to the grid electrode of the vacuum tube 31, and conventionally included within the coupling path of the DC coupled luminance amplifier 13. A brightness control conventionally serves to vary the DC level at the plate electrode of the output video amplifier 31 thus providing a desired quiescent bias between the respective cathode electrodes of the kinescope 21 and the grid electrodes. Such a bias between the cathode and grid electrodes, determines the quiescent beam current and hence the brightness provided for the kinescope display. In typical receivers the kinescope cathode bias is determined, as mentioned above, by the DC voltage at the output electrode of the video amplifier. The kinescope grid bias is determined by means of DC restoring circuits 26 which serve to bias the grids with respect to the cathodes at a predetermined operating point. Such DC restorers 26, comprise clamping diodes which are caused to conduct upon receipt of a horizontal flyback pulse, and provide a suitable voltage across coupling capacitors located between the demodulator matrix 25 output and each respective grid electrode of the kinescope. The cathode electrode of the vacuum tube 31 is returned to ground through a switch contact 32 in series with a biasing resistor 35. In AC shunt with resistor 35 is a potentiometer 36 used as a contrast control. The variable arm of potentiometer 36 is returned to ground for AC signals via the bypass capacitor 37. The function of the resistor 36 and capacitor 37 is to increase or reduce the AC gain of the video output stage 31, thus affecting the contrast of the final display. A capacitor 40 is coupled between the cathode electrode of vacuum 31 and ground and is used to provide a desired high-frequency response for the video output amplifier stage. A further network coupled to the cathode electrode comprises a resistor 41 in series with a capacitor 42 also used to provide frequency response compensation for the amplifier 31.

In the position of switch 32, as shown in the FIGURE the DC return path for current flowing through the vacuum tube 31 is provided through the switch contact thence through resistor 35 to ground. The switch 32 has another pole associated therewith, connected between that pole and the plate load 33 of the video amplifier is a resistor 44 used for providing a suitable biasing potential for the kinescope, when the switch 32 is operated in the kinescope setup condition as will be described subsequently. The switch 32 as shown in the FIGURE further includes another switch section having two poles arranged in a double throw configuration. One pole is coupled to the vertical oscillator and deflection circuitry 16, and in the position shown representing normal receiver operation does not affect the vertical circuitry. In the dashed-line position representing the kinescope setup mode, this portion of the switch 32 serves to ground a suitable terminal of the vertical oscillator and deflection circuit 16 thus serving to disable the same, causing the raster to collapse vertically. It is noted that the following sequence of events occurs when the switch 32 is thrown from the normal receiver operation, as shown, to the dashline or kinescope setup procedure position. When switch 32 is placed in the dashline position, one contact connects resistor 44 to the common terminal between resistor 35 and resistor 36. It is noted that the connection provided by the associated switch contact also opens the DC path for the cathode of the vacuum tube 31, thus inactivating the device 31 and, therefore, removing all amplification properties of the vacuum tube. Resistor 44 is selected in conjunction with the resistor 33 and 35 to provide a suitable operating potential for the kinescope cathode electrodes with respect to that potential provided at the grid electrodes to maintain a desired grid to cathode bias, for enabling the setup adjustments. The other section of the switch 32 serves to ground the vertical oscillator 16 thus collapsing the raster. When the switch 32 is thus placed in this kinescope setup position (dashed line), the operator may now adjust the screen potentiometers located in module 46. Each separate potentiometer is tuned to minimum setting thus serving to cutoff the three electron guns extinguishing the line on the display. The ability to cut off the kinescope by the screen potentiometer adjustment range is assured by the selection of resistor 44 for determining the cathode to grid bias of the kinescope. Each one of the screen potentiometers is now separately adjusted to increase the screen potential until the respectively associated gun is caused to just light the display screen (i.e., until a barely visible horizontal line trace is produced on the kinescope screen by the bombardment of electrons from that gun.) If initially the adjustment of the first screen potentiometer is made to just light the red gun, the next adjustments are done so that the blue and green guns light the screen as well due to the respective adjustment of the blue and green screen potentiometers.

The kinescope is now properly adjusted for optimum tracking. The switch 32 is then again placed in the solid line position for normal receiver operation, and the cathode load is returned to the video amplifier 31, resistor 44 is removed and the vertical oscillator section 16 is enabled and, therefore, oscillates. The specific advantages of the apparatus shown and described are many. First, by incorporating the bias setup switch in the cathode circuit of the output video amplifier 31, the addition of shunt capacity introduced by the added switch wiring, is much less stringent than that in certain of the prior art configurations. This is so as the cathode circuit is a relatively lower impedance circuit and peaking capacity such as 40 is required in any case to frequency compensate the amplifier optimumly. Hence the switch 32 may now be located relatively remote from the video amplifier or actually be placed on the back panel of the receiver because the lead-length and the subsequent shunt capacity afforded thereby is not critical and would only serve in combination with capacitor 40 needed to bypass the cathode circuit of amplifier 31 for high frequency. Therefore, with the switch 32 located as shown all one has to do in practice is to decrease the value of capacitor 40. Furthermore, all operating bias requirements for the kinescope 21 are provided during the setup procedure by the single additional resistor 44, which does not consume or waste power during the normal receiver operation mode and is only dissipating energy during the setup procedure mode. In contrast many of the prior art setup circuits employing switching techniques serve to dissipate power in all operating modes of the receiver. Secondly, of course, is the fact that in the embodiment shown the video channel is entirely disabled, as the DC supplied for the vacuum tube 31 is opened and hence there can be no coupling of video signals or tube current to the kinescope during the setup condition.

Furthermore, the video amplifier 31 having an opened DC current path during the setup position does not dissipate any power and hence power requirements are actually decreased during the kinescope setup mode.

Apparatus utilizing the above invention used the following components, by way of example:

| | | |
|---|---|---|
| Resistors | 32 | 12,000 ohms. in shunt with 270 uhy. inductor |
| | 33 | 4.4 Kilohms |
| | 35 | 180 ohms |
| | 36 | 500 ohms. (variable) |
| | 41 | 270 ohms. |
| | 44 | 22,000 ohms. |
| Capacitors | 37 | 200 microfarads |
| | 40 | 1000 micromicrofarads |
| | 42 | 680 micromicrofarads |
| Vacuum Tube | 31 | 7KY6 |
| Screen Supply | | −V+130 volts |
| Plate Supply | | B+−+280 volts |
| Kine Screen Adjust Supply | | E+−+680 volts |

What is claimed is:

1. In a color television receiver including a color kinescope having a plurality of electron guns each of said electron guns including a beam intensity control electrode, said receiver also including a video information signal source having an output terminal direct coupled to each of said beam intensity control control electrodes, said video signal source including at least one active device and a load impedance connected in series with said active device between two terminals of a source of operating potential for energizing said active device and therefore said video information signal source and said receiver including means for deflecting electron beams produced by said respective guns in a pair of mutually perpendicular directions, control apparatus comprising in combination:

a. switching means coupled in series with said active device and said load impedance and operative in a first position for disconnecting said active device from said load impedance to remove said source of operating potential from said active device to therefore disable said device, said switching means including means operative in said first position for coupling said load impedance to said source of energizing potential for applying to said beam intensity control electrodes of said kinescope a predetermined bias for each of said electron guns.

2. The control apparatus according to claim 1, wherein said means operative in said first position includes a resistor for coupling said load impedance between said source of energizing potential and said load impedance to form a voltage divider for providing said predetermined bias for each for of said electron guns.

3. The control apparatus according to claim 1 further including, second switching means associated with said beam deflection means for selectively disabling the deflection of said beam in at least one of said pair of mutually perpendicular directions.

4. In a color television receiver including a color kinescope having a plurality of electron guns each of said electron guns including a beam intensity control electrode, said receiver also including a video information signal source having an output terminal, and a source of energizing potential, and said receiver further including beam deflecting means for deflecting electron beams produced by said respective guns in a pair of mutually perpendicular directions, control apparatus comprising in combination:

a. an active device having input, output and common electrodes;

b. means including at least one load impedance coupling said output and common electrodes across said source of energizing potential for energizing said active device;

c. a first direct current coupling path between said input electrode of said active device and said video information signal source;

d. a second direct current coupling path between said output electrode of said active device and said beam intensity control electrodes of said kinescope for applying video information signals thereto;

e. switching means operative in a first position for disconnecting said load impedance from said active device to disable said active device and, therefore, said video signals applied to said beam intensity control electrodes, said switching means including means for connecting said load impedance across said source of energizing potential for providing a predetermined operating bias to said electron beam intensity control electrodes, and f. second switching means associated with said beam deflection means for selectively disabling the deflection of said beams in one of said pair of mutually perpendicular directions.

5. The control apparatus according to claim 4 wherein said active device is a vacuum tube having a plate output, a common cathode electrode and a grid input electrode.

6. The control apparatus according to claim 5 wherein said load impedance includes a resistor coupled between said cathode electrode and the point of reference potential of said energizing supply.

7. Setup control apparatus for use in a color television receiver having a color kinescope included therein, said kinescope having a plurality of electron guns each one having a beam intensity control electrode, said receiver also including a video information signal source having an output terminal, said receiver further including a source of operating potential, and said receiver including means for deflecting electron beams produced by said respective guns in a pair of mutually perpendicular directions, comprising in combination:

a. an active device having input, output and common electrodes, a first direct coupling path between said output electrode and said beam intensity control electrodes of said kinescope, and a second direct coupling path between said input electrode and said output terminal of said video signal source, b. switching means including a resistor coupling said output electrode and said common electrode of said active device across said source of operating potential for energizing said device in a first selectable position of said switching means and for disconnecting said active device from said source of operating potential in a second selectable position of said switching means, which second selectable position includes means for connecting said resistor across said source of operating potential for providing a predetermined bias to said beam intensity control electrodes of said kinescope of a magnitude useful for kinescope setup.

8. The apparatus according to claim 7 further including:

a. second switching means associated with said beam deflection means for selectively disabling the deflection of said beam in one of said pair of mutually perpendicular directions for said second selectable position of said switching means.

9. Setup control apparatus for use in a color television receiver having a color kinescope included therein, said kinescope having a plurality of electron guns each one having a beam intensity control electrode, said receiver also including a video information signal source having an output terminal, said receiver further including a source of operating potential, and said receiver including means for deflecting electron beams produced by said respective guns in a pair of mutually perpendicular directions, comprising in combination:

a. an active device having input, output and common electrodes, a first direct coupling path between said output electrode and said beam intensity control electrodes of said kinescope, and a second direct coupling path between said input electrode and said output terminal of said video signal source, b. means coupled to said output electrode of said active device adapted to apply thereto said operating potential, c. a first resistor having first and second terminals, said second terminal connected to a point of reference potential, d. switching means having first and second selectable positions, said first position coupling said first terminal of said resistor to said common terminal of said active device to thereby complete a DC path for said active device, said second position serving to disconnect said resistor from said common terminal, e. a second resistor having a first terminal coupled to said first direct coupling path and a second terminal coupled to said switching means in said second position, to form a voltage divider with said first resistor for biasing said beam intensity control electrodes of said kinescope at a predetermined bias in said second position.

UNITED STATES PATENT OFFICE
CERTIFICATE OF CORRECTION

Patent No. 3,612,757 Dated October 12, 1971

Inventor(s) George Edward Anderson

It is certified that error appears in the above-identified patent and that said Letters Patent are hereby corrected as shown below:

Column 5, lines 51-52, that portion reading "control control electrodes" should read -- control electrodes --.

Column 5, line 75, that portion reading "for each for of said" should read -- for each of said --.

Signed and sealed this 14th day of March 1972.

(SEAL)
Attest:

EDWARD M.FLETCHER,JR.
Attesting Officer

ROBERT GOTTSCHALK
Commissioner of Patents

RM PO-1050 (10-69)

USCOMM-DC 60376-P69
☆ U.S. GOVERNMENT PRINTING OFFICE : 1969 O—366-334